United States Patent [19]

Ross et al.

[11] 4,259,017
[45] Mar. 31, 1981

[54] METHODS FOR USE IN DEFINITION OF OBJECT SURFACES

[75] Inventors: Joseph A. Ross, Fort Salonga; Howard K. Stern, Greenlawn, both of N.Y.

[73] Assignee: Dynell Electronics Corporation, Melville, N.Y.

[21] Appl. No.: 838,835

[22] Filed: Oct. 3, 1977

[51] Int. Cl.³ .................... G01B 11/00; G01B 11/24
[52] U.S. Cl. ................................. 356/375; 356/376
[58] Field of Search ............. 356/375, 398, 376; 250/558

[56] References Cited

U.S. PATENT DOCUMENTS

| | | | |
|---|---|---|---|
| 3,799,675 | 3/1974 | Johnson et al. | 356/152 |
| 3,866,052 | 2/1975 | Di Matteo et al. | 250/558 |
| 4,145,991 | 3/1979 | Di Matteo et al. | 356/375 |

Primary Examiner—John K. Corbin
Assistant Examiner—Wm. H. Punter
Attorney, Agent, or Firm—Watson, Leavenworth, Kelton & Taggart

[57] ABSTRACT

In a method for defining the spatial location of points comprising an object surface, radiant energy is projected onto the object in successive steps with the energy projected in each step having a unique change in intensity with distance along an axis extending transversely of the projection field. The spatial locations of surface points are derived by comparison of reflected intensity information derived from records of the object so irradiated and predetermined patterns derived in accordance with the intensity changes with transverse distance in the respective energy projections.

13 Claims, 26 Drawing Figures

//patents.google.com/patent/US4259017

METHODS FOR USE IN DEFINITION OF OBJECT SURFACES

FIELD OF THE INVENTION

This invention relates generally to the reproduction of objects in three dimensions and more particularly to methods involving the use of photographic or like two-dimensional records in the generation of three-dimensional information defining object surfaces.

BACKGROUND OF THE INVENTION

In U.S. Pat. No. 3,866,052, commonly-assigned herewith, methods for use in defining the spatial location of a point on an object surface involve the practice of projecting radiant energy onto the surface through digital mask structure, i.e., masks having respectively discrete energy transmissive and energy non-transmissive extents. In the preferred practice of the U.S. Pat. No. 3,866,052, differently configured masks establish diverse irradiated segments of the projection field and are used successively. Records made in corresponding succession are examined to identify those records in the succession of records which contain, or do not contain, a representation of the illumination of each surface point of interest. Digital signal patterns are generated from the record succession unique for surface points which are in different projection field segments. These signals, together with information as to the positional location of surface points in the two-dimensional records and the spatial location of the recording lens node enable transition from two-dimensional data to spatial position determination. The lens node and record positional information establish a line of sight to the surface point and the digital signals identify the location of such point along the line of sight.

The degree of resolution in spatial point location in the U.S. Pat. No. 3,866,052 digital practice is dependent on the number of irradiated segments established by the most expanded digital mask used. The measure of error is accordingly related to the narrowest width segment and surface points closely disposed within such segment are not distinguishable from one another. In practice under the U.S. Pat. No. 3,866,052, operative mask segment subdivision is thus selected in accordance with desired resolution. The succession of projections and records is expanded to attain high resolution with accompanying expenditure of practice time and record making time and expense.

In an alternative practice set forth in the U.S. Pat. No. 3,866,052, energy projection is made through a single mask having plural unique frequency-transmissive extents. Disparity between projection field segments in a common record is achieved since each segment has unique frequency character. On the other hand, differentiation between surface points closely located in a common segment is not provided, and ultimate resolution is again determined by the number of mask segment subdivisions.

SUMMARY OF THE INVENTION

It is an object of the present invention to provide improved methods for use in radiant energy examination and spatial definition of object surfaces.

A more particular object of the invention is to provide practices akin to those of the U.S. Pat. No. 3,866,052, but with lessening of time expenditure and record making.

In attaining the foregoing and other objects, the subject invention provides a practice wherein a projection field is established extending from a given location to an object surface and radiant energy is projected into the projection field with the intensity, or other characteristic, of such radiant energy conforming successively, per projection, to plural different patterns along an axis transverse to the direction of the projection field. Preferably, a succession of four energy projection steps is used with the intensity of the first step conforming to a first pattern along such axis, the intensity in the second step being in second pattern inverse to the first pattern, the intensity in the third step being in third pattern diverse to the first pattern, and the intensity in the fourth step being in fourth pattern inverse to the third pattern. Records are made of the object surface separately for each such irradiation thereof and intensity representations in the records are correlated, at points corresponding to each surface point of interest, with intensity indications of an output master pattern. The output master pattern is derived from the projected intensity patterns. The amplitude and sign of the output master pattern is a function of position transverse to the axis projection.

By combining the first and second patterns, and the third and fourth patterns, respectively, applicants establish first and second master patterns from which the master output pattern is derived. Typically, the first pattern may comprise a sine function, the second pattern an inverted sine function, the third pattern an inverted cosine function and the fourth pattern a cosine function. The first master pattern, which in this case is a master sine, is reached by subtracting the first and second patterns and the second master pattern, which in this case is a master cosine, is reached by subtracting the third and fourth patterns. The master output pattern is reached by developing the ratio of amplitudes of the first and second master patterns and, in the example discussed, is a tangent function.

As is discussed in detail below, the invention preferably contemplates repetitive practices of the foregoing method with different frequencies underlying the patterns in each practice whereby, in the given example, the sine function may be cyclic repetitively over the transverse axis extent.

The foregoing and other objects and features of the invention will be further understood from the following detailed description of preferred practices thereof and from the drawings wherein like reference numerals identify like parts throughout.

DESCRIPTION OF THE DRAWINGS

FIGS. 5(a) through 5(d) are graphical showings indicative of a type of intensity variation with distance along transverse axis TA of FIG. 1 in accordance with the present invention.

FIGS. 8(a) through 8(d), 9(a) and 9(b) and 10 show patterns corresponding to those of FIGS. 5(a) through 5(d), 6(a) and 6(b) and 7 but of different frequency.

DESCRIPTION OF PREFERRED PRACTICES

Figure 1:
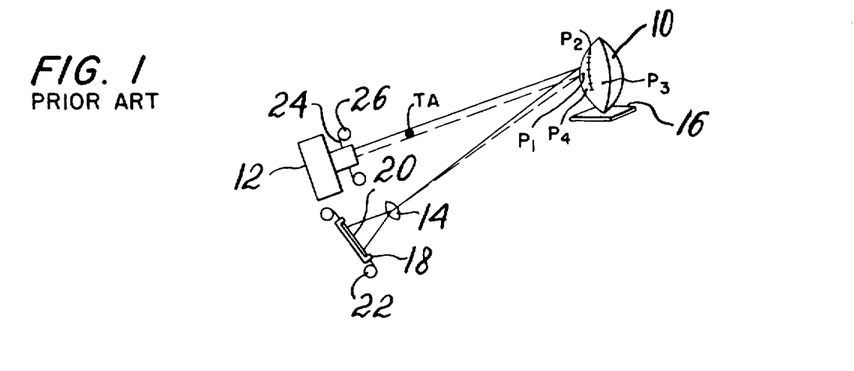
FIGS. 1, 2 and 4 are showings carried over from the above-referenced U.S. Pat. No. 3,866,052 and included for convenience in illustrating types of apparatus which may be used in practicing this invention.

The apparatus shown in FIG. 1 in schematic fashion includes an object 10, a surface of which is to be reproduced in its three dimensions. The object is disposed in the field of projection of radiant energy projector 12 and further in the field of view of objective lens 14. The object is supported, for example, by pedestal 16, and projector 12 and lens 14 are secured in fixed relation to the pedestal. Member 18 supports single frames of recording medium 20 in the focal plane of lens 14. Record medium transport spools are associated with member 18 for collecting recording medium frames on exposure and for advancing unexposed recording medium frames into member 18.

Figure 2:
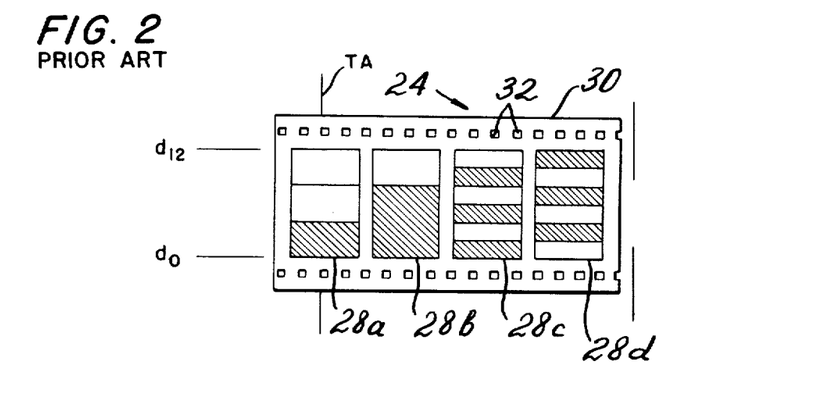

Axis TA is added to the showing in the above-referenced U.S. Pat. No. 3,866,052 for convenience of explanation of the present invention, such axis extending transversely to the projection field of projector 12. Masking element 24 of FIG. 2 is of type shown in the corresponding drawing of the U.S. Pat. No. 3,866,052, except for addition thereto of axis TA, which extends vertically with respect to the horizontally movable element 24. As shown in FIG. 2, the illustrated masking element of the U.S. Pat. No. 3,866,052 includes a plurality of masks 28a–d each having expanses transmissive to radiant energy and further expanses, shown by cross-hatching, which are non-transmissive thereto. The masks are desirably supported on a web-like substrate 30 which is transmissive to radiant energy solely in the areas thereof on which masks 28a–d are disposed. Transport of the masking element, and hence mask-changing, is facilitated by such means as apertures 32 which may be engaged by complementary pins on spools 26 (FIG. 1).

Figure 3A:
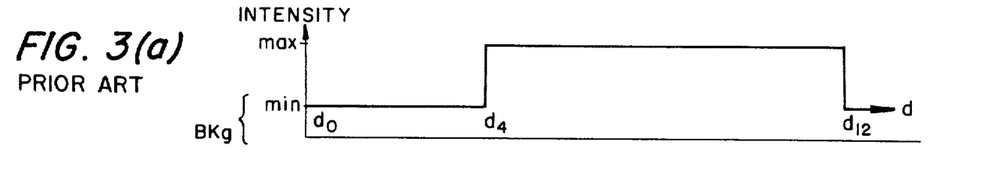
FIGS. 3(a) through 3(d) are graphical showings indicative of intensity variation with distance along transverse axis TA of FIGS. 1 and 2 in use of the masks of FIG. 2.

With the vertical extent of mask 28a considered as commencing at the bottom edge of the cross-hatched area thereof, i.e., location $d_0$, and ending at the upper edge of its upper transmissive area, i.e., location $d_{12}$, FIG. 3(a) indicates the characteristic of intensity of projected radiant energy with distance along translation axis TA. A discrete step of constant intensity (Max.) radiant energy is projected into the projection field segment extending from $d_4$ to $d_{12}$. The base of such step (Min.) extends from $d_0$ to $d_4$. FIG. 3(a) also shows an extent between intensity zero and Min., corresponding to background (Bkg.) radiant energy which exists in the projection field.

Figure 3B:
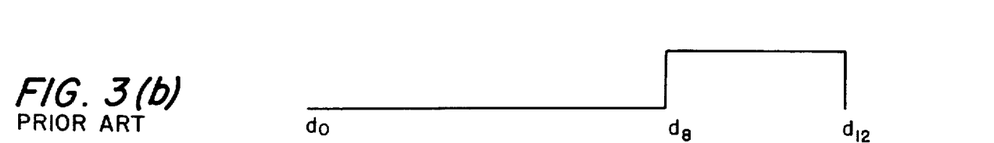
Figure 3C:
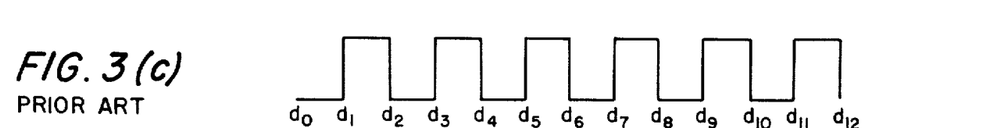
Figure 3D:
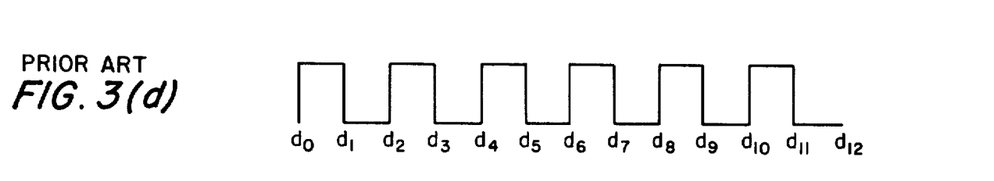

FIG. 3(b) indicates that the projection field extent along axis TA from $d_8$ to $d_{12}$ is discretely irradiated by use of mask 28b, again at constant intensity. FIGS. 3(c) and 3(d) show the intensity patterns with distance along axis TA for masks 28c and 28d, respectively.

Figure 4:
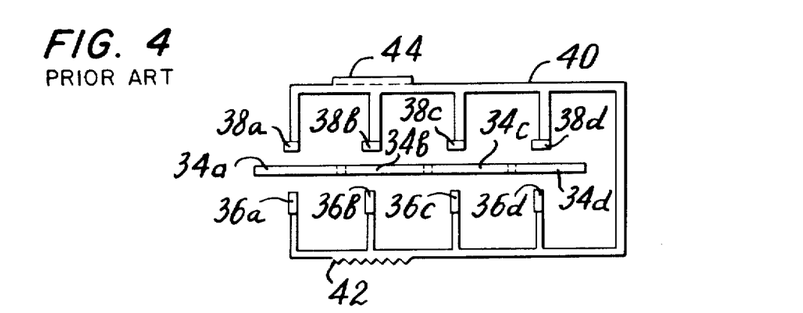

As is discussed more fully in the U.S. Pat. No. 3,866,052, object surface points irradiated by energy issuing through the mask sequence, and situated, for example, within the segment of the projection field between locations $d_6$ and $d_7$ will evidence the common digital signal 1001 [Max. intensity in FIGS. 3(a) and 3(d), Min. intensity in FIGS. 3(b) and 3(c)] based on examination of records of the object surface irradiated on successive projections through masks 28a–d. By way of brief summary of such '052 disclosure, apparatus shown herein in FIG. 4 provides for disposition of developed film frames 34a–34d (taken respectively with masks 28a–28d) between pencil-beam radiant energy sources 36a–36d which are arranged in fixed alignment with radiant energy sensors 38a–38d. A scanning mechanism 40 is associated with the source-sensor pairs, inclusive of an x translational rack 42 and a y translational rack 44, the respective racks being associated with motor-driven pinions, or the like, operative to position the source-sensor pairs in any desired x,y location with respect to the developed film frames. For a given x,y film frame location, the film frame x,y data with the lens node positional data identify a line-of-sight to the object surface point coincident therewith. The digital signal identifies further information which, with the line-of-sight data, enables one to identify the spatial location of the object surface point as the intersection of the line-of-sight with a projection segment that may approach a plane, the latter being derived from the digital signal. Accordingly, resolution as between closely spaced object surface points is achieved under the U.S. Pat. No. 3,866,052 practice only on increase in the numbers of transmissive and non-transmissive sections of the masking element to place such points in diverse projection field segments.

Figure 5A:
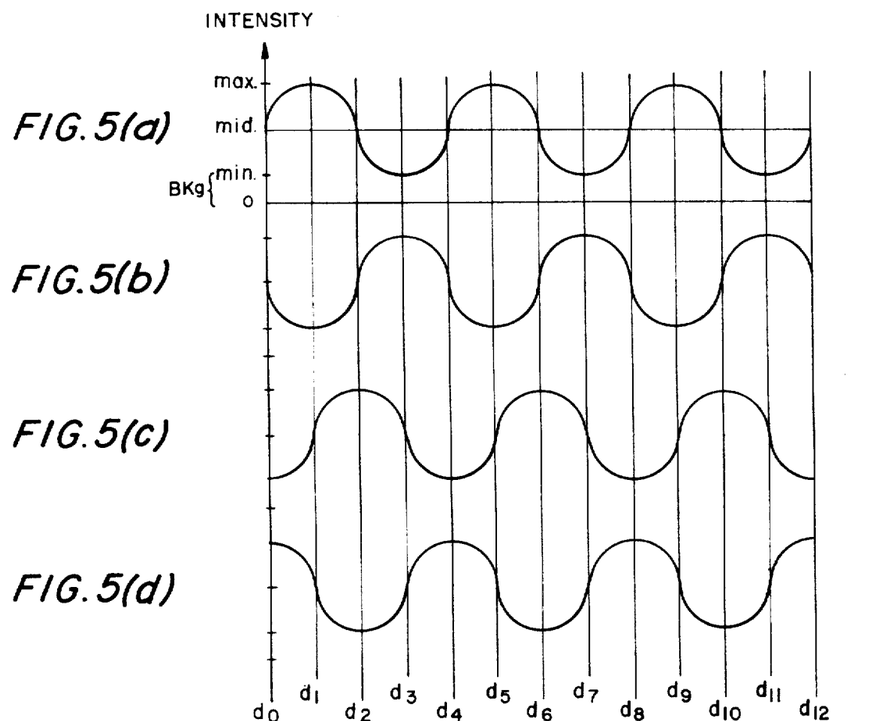

In accordance with the subject invention, masks are constructed such that radiant energy patterns are provided thereby which exhibit projected energy having a characteristic continuously varying with change in distance along translation axis TA. As contrasted with the constant intensity evidenced in FIGS. 3(a)-3(d) in discretely spaced transmissive areas of the masks, FIG. 5(a) depicts a typical radiant energy pattern according with the invention, i.e., continuously varying in intensity along axis TA. In the embodiment shown by FIG. 5(a), such intensity variation follows a sine function, three full cycles of the sine wave occurring between $d_0$ and $d_{12}$. Masking element 46 of FIG. 5(e) includes masks 46a–d having patterns $P_I$–$P_{IV}$, respectively. The intensity-distance characteristics of the FIG. 5(a) pattern may be realized, where desired, by placing masking element 46 in the FIG. 4 apparatus and operating the motor of y translational rack 44, source-sensor pair 36a–38a being thereby advanced from mask 46a location $d_0$ through mask 46a location $d_{12}$. Masks 46b–46d are constructed to conform in intensity to patterns $P_{II}$-$P_{IV}$, corresponding to the patterns shown respectively in FIGS. 5(b)–5(d). The patterns may again be realized as to intensity-distance characteristics by use of such as the FIG. 4 apparatus. The apparatus only approximates the actual projected distribution because the background level, Bkg., may not equal that of the actual projection. However, the master patterns that result will be invariant since they result from a subtraction in which the backgrounds cancel.

Akin to the practice of the U.S. Pat. No. 3,866,052, uniform radiant energy, e.g., light, is applied to mask 46a and issued into the projection field onto the object surface. A record, e.g., photograph, is made of the object surface so irradiated. The object surface is irradiated next through mask 46b, defining pattern $P_{II}$ inverse to pattern $P_I$, i.e., a 180°-displaced sine function. A record is made of the object surface so irradiated through mask 46b. Next, mask 46c is moved into registry in the FIG. 1 projector. Pattern $P_{III}$, shown in FIG. 5(c), of this mask is required to differ from pattern $P_I$, and is shown to be a cosine function lagging the FIG. 5(a) sine by 90°. Following the making of a record of the object surface irradiated through mask 46c, the procedure is repeated with mask 46d, which defines pattern $P_{IV}$, inverse to pattern $P_{III}$, i.e., a 180°-displaced cosine function. The net effect of the successive projection is to encode the projection space in a manner that is suitable for photographic or other recording.

Figures 6A, 6B:
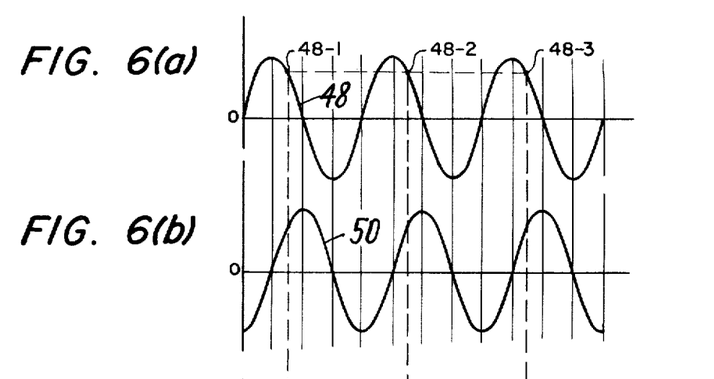
FIGS. 6(a) and 6(b) are graphical showings of first and second master patterns in accordance with the invention.

Referring to FIG. 6(a), first master pattern 48 is provided by subtractive combination of the patterns of FIGS. 5(a) and 5(b) and has a peak-to-peak amplitude about zero, which is twice the peak-to-peak amplitude of the patterns of FIGS. 5(a) and 5(b). In such pattern combination, background radiant energy is advantageously eliminated, i.e., Bkg. less Bkg. is zero. FIG. 6(b) shows second master pattern 50, reached by subtractive combination of the patterns of FIGS. 5(c) and 5(d) and having peak-to-peak amplitude about zero, which is twice the peak-to-peak amplitude of the FIGS. 5(c) and 5(d) patterns, with background likewise eliminated.

Figure 7:
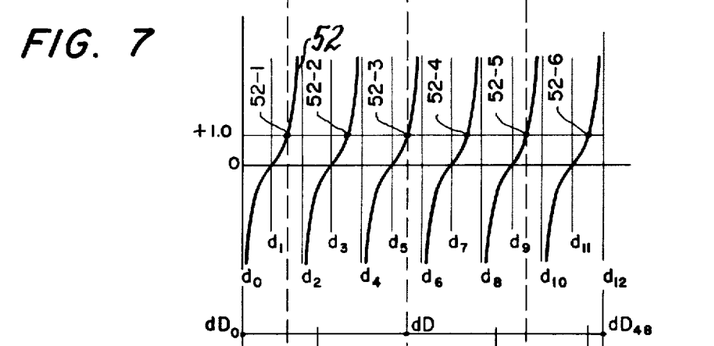
FIG. 7 is a graphical showing of a master output pattern in accordance with the invention.

In further practice under the invention, the first and second master patterns are combined to develop a master output pattern. This pattern has a unique characteristic value for each distance coordinate thereof through each half-cycle of the FIG. 6(a) pattern. In the illustrated example, master output pattern 52 of FIG. 7 is reached by divisional combination of patterns 48 and 50. Pattern 48 (sine) divided by pattern 50 (cosine) yields a tangent function. In amplitude, such function yields values from negative finite numbers to zero from somewhat more than $d_0$ to $d_1$ and yields values from zero to positive finite numbers from $d_1$ to somewhat less than $d_2$, and is thereafter repetitive in like fashion.

The four records made with an object in the projection field are examined in accordance with the apparatus of FIG. 4 to develop signals indicative of the four intensities recorded at each x,y record location of interest. For any given record location indicative of an object surface point, the intensities in the first and second records are subtracted and the intensities in the third and fourth records are subtracted. The ratio of such intensities is determined. This information as compared to the master patterns will provide a match at only one point in a cycle of the master output pattern and so is indicative of the point's location in the projection field. The encoding of a point on the object surface as read from the record duplicates the spatial encoding produced at that point by the successive projections. The effects of background illumination are removed by the subtractions and object reflectance is rendered unimportant since intensity ratios are used.

By way of example, assume at a given record location, $x_n$ and $y_n$, the ratio derived as above from the records is (+) 1.0. Given a linear recording process, this must correspond to the value +1.0 of FIG. 7 which occurs at points 52-1 through 52-6. Given the further information that at $x_n, Y_n$ the subtracting of the intensity data of the second-made record from that of the first-made record yields a positive, and knowing that the subtraction of the FIG. 5(a) and 5(b) patterns is positive only at points corresponding to points 52-1, 52-3 and 52-5, i.e., FIG. 6(a) points 48-1, 48-2 and 48-3, points 52-2, 52-4 and 52-6 are eliminated from consideration. Ambiguity is accordingly lessened to locations $d_{1.5}$, $d_{5.5}$ and $d_{9.5}$, i.e., +1.0=tan 135°, 495° 855°, and the spatial residence of the object surface point is now known to be in a projection segment corresponding to one of such mask locations.

The unique one of the foregoing residences is preferably determined by repetition of the practice discussed to this juncture with modification, for example, in frequency, of projection of the patterns above-discussed.

Referring to FIGS. 8(a)-8(d), patterns are shown respectively constituting sine, inverse sine, cosine and inverse cosine functions which are identical to the counterpart functions of the patterns in FIGS. 5(a)-5(d), except for the frequency thereof. Four cycles occur for the former patterns as opposed to three cycles for the latter patterns over transverse axis TA distance $d_0$ to $d_{12}$, $D_0$ to $D_{16}$. Locations $D_0-D_{16}$ identify the maximums, zeros and minimums of the patterns of FIGS. 8(a)-8(d) whereas locations $d_0-d_{12}$ identified the maximums, zeros and minimums of the patterns of FIGS. 5(a)-5(d).

Figure 5E:
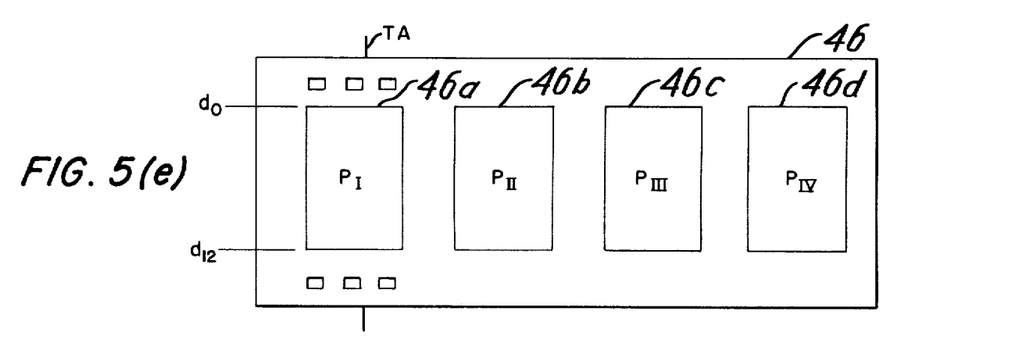
FIG. 5(e) illustrates a masking element useful in conjunction with the projector of FIG. 1 for practicing the subject invention.
Figure 8A:
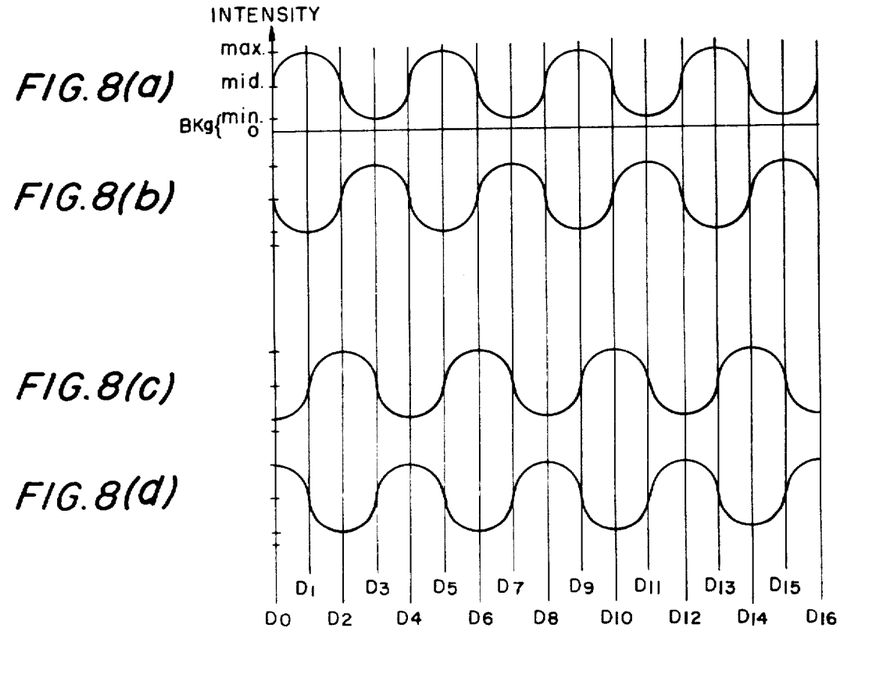
Figure 8E:
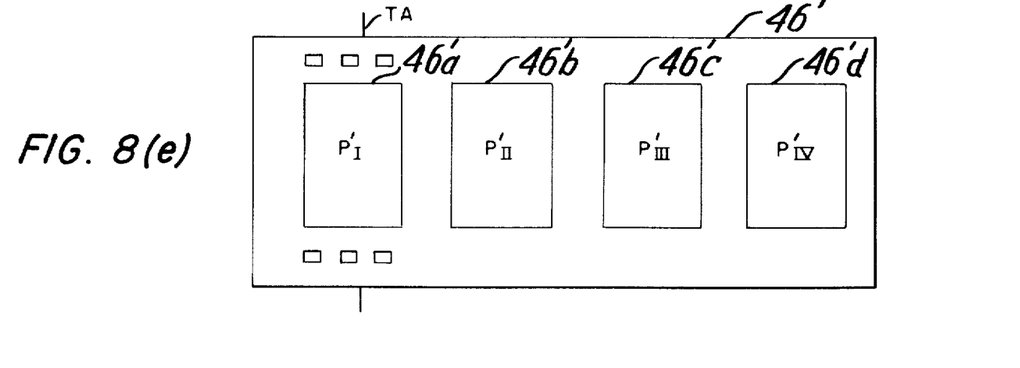
FIG. 8(e) illustrates a masking element corresponding to the patterns of FIGS. 8(a) through 8(d).
Figures 9A, 9B:
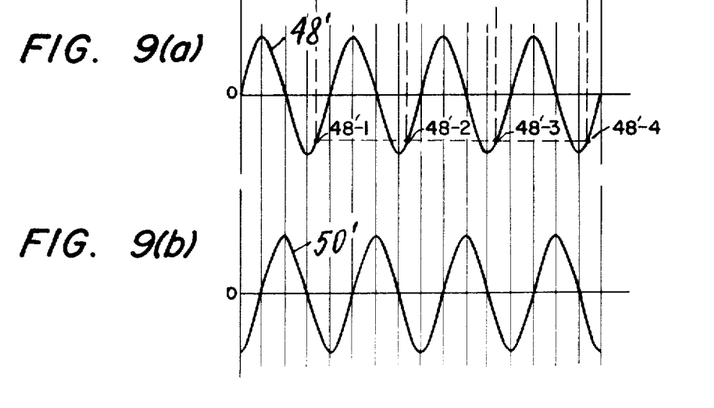
Figure 10:
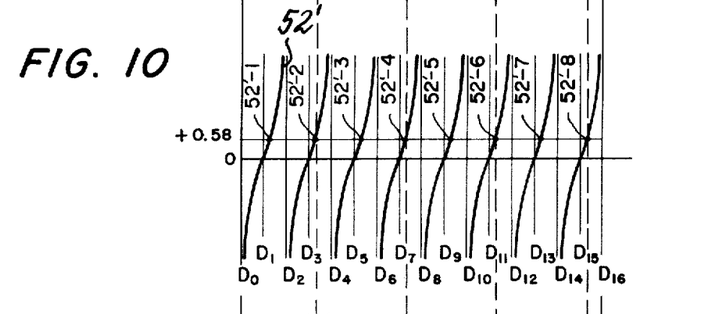

Masking element 46′, shown in FIG. 8(e) corresponds to masking element 46 of FIG. 5(e) but has masks 46′a-46′d which define patterns $P′_I-P′_{IV}$. The four patterns of 8(a) through 8(d) as manipulated in the above-discussed manner to provide modified first and second master patterns 48′ and 50′, shown in FIGS. 9(a) and 9(b) and modified or further master output pattern 52′, shown in FIG. 10.

The above-discussed irradiation and record-making practices are repeated as are the intensity combination practices. Processing this group of records for locations $x_n, y_n$ thereof, in manner above-discussed, i.e., subtracting the intensity values at $x_n, y_n$ of the first and second records, and then of the third and fourth records, and taking the ratio of the subtractions, one finds an intensity value, for example, of +0.58. This identifies points 52′-1 through 52′-8 in FIG. 10. Given the further information that at $x_n, y_n$ the subtracting of the intensity data of the second-made record from the first-made record yields a negative and noting that the subtraction of the FIGS. 8(a) and 8(b) signals is negative only at points corresponding to points 52′-2, 52′-4, 52′-6 and 52′-8, i.e., FIG. 9(a) points 48′-1, 48′-2, 48′-3 and 48′-4, points 52′-1, 52′-3, 52′-5 and 52′-7 are eliminated from consideration.

As noted above, distance $d_0$ to $d_{12}$ is identical with the distance $D_0$ to $D_{16}$. A common multiplicand distance for the $d_0$ and $D_0$ scales is the distance $dD_0$ to $dD_{48}$, shown between FIGS. 7 and 10. Extending vertical lines through points 52-1, 52-3 and 52-5 of FIG. 7 identifies first points of intersection on the $dD_0$ scale as indicated. Likewise, extending vertical lines through points 52′-2, 52′-4, 52′-6 and 52′-8 yields further points of intersection along scale $dD_0$. Coincidence exists only between one such line extending from FIG. 7 and a line extending from FIG. 10, namely, the line common to points 52-3 of FIG. 7 and 52′-4 of FIG. 10. This point of intersection, identified as $dD_{22}$ uniquely identifies the segment of the projection field containing the object surface point corresponding to record point $x_n, y_n$. As in the U.S. Pat. No. 3,866,052, and as discussed fully above, such object surface point may now be reconstructed in its true spatial location from the record coordinates $x_n, y_n$, the recording lens node position and the segment identification.

As an alternative to the foregoing combination practices for evaluating records, an output reference signal may be reached by taking the square root of the sum of the squares of the two sets of subtracted intensity values. Then, the ratio of either of the first or second signals derived by subtraction to the output reference signal can be used to locate two possible solutions, sine and cosine, which are separable by the sign of the tangent function master and which do not themselves go to infinity. This practice is convenient as it avoids the use of ratios which go to infinity, as occur in the master output signals of FIGS. 7 and 10.

Alternatively, the tangent function master can be supplemented with a cotangent function master for use where the tangent function master goes to infinity. The cotangent function master is used with the reciprocal of the ratio of intensities used with the tangent function master.

Radiant energy patterns other than the sine, cosine functions may be employed in practicing the invention. Thus, the invention contemplates continuously varying intensity with distance as would be provided by sawtooth functions, triangular functions, concentric rings, and the like. In the case of sawtooth or triangular functions, the patterns will be as in FIGS. 5(a)-5(d) except that they will be sawtooth or triangular as opposed to sinusoidal. Subtraction and ratio determination of such patterns will yield masters counterpart to those of FIGS. 6(a), 6(b) and 7. The masks for the triangular or sawtooth case will be akin to the masks in the sinusoidal case except that their transmissivity character will exhibit triangular or sawtooth change over the distance $d_0$ to $d_{12}$.

Figure 11:
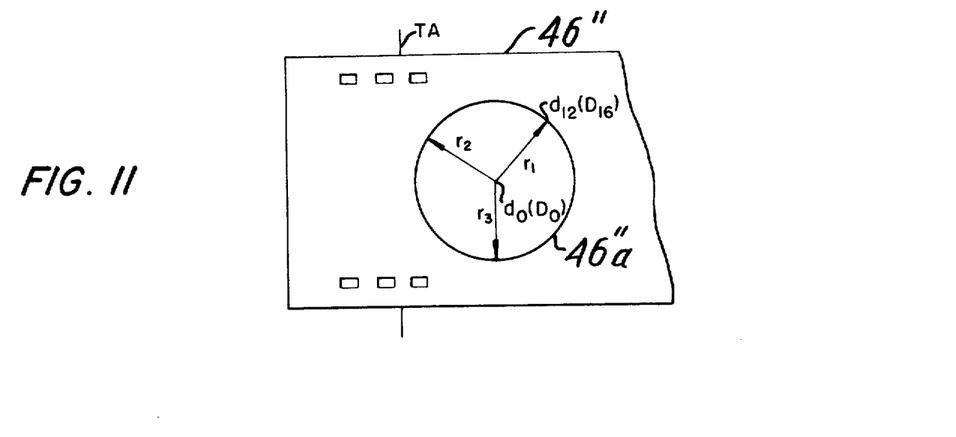
FIG. 11 illustrates a further masking element for use in practicing the invention.

In the concentric ring case, masks are configured as shown in FIG. 11. There, mask element 46" includes successive masks, one being shown as 46"a. With $d_0$ assigned to the center of mask 46"a, the mask transmissivity pattern along all radii extending outwardly to the mask perimeter ($d_{12}$) will follow the transmissivity pattern shown in FIG. 5(a), i.e., a three-cycle sine wave. The next successive mask (not shown) will exhibit a mask transmissivity pattern according with FIG. 5(b) and the third and fourth mask patterns will follow FIGS. 5(c) and 5(d) in mask transmissivity patterns. The generation of first and second master patterns and master output patterns will follow directly the practices outlined above for the sinusoidal case. Where ambiguity is resolved by the diverse frequency mode, a further masking element is employed, identical to masking element 46" except for variation in frequency, as indicated by the parenthetical inclusions in FIG. 11 of the alternative center $D_0$ and the alternative perimeter $D_{16}$. As in the example discussed above, three cycles may be used in the $d_0-d_{12}$ situation and four cycles may be used in the $D_0-D_{16}$ situation.

The number of records made in the foregoing illustrative example is eight, giving rise to resolution throughout the extent of the masks along transverse axis TA, substantially fewer records than are required to attain like resolution in practice outlined in U.S. Pat. No. 3,866,052. A still further reduction in the number of photographs may be achieved by employing color or other frequency selective techniques in the record making and energy projections. For example, color television separates three independent colors. Each color could be assigned to a particular spatial pitch. Thus, the patterns of FIGS. 5(a)-5(d) could be transmitted and recorded in red, those of FIGS. 8(a)-8(d) could be transmitted and recorded in green and an additional set of four patterns at another spatial pitch could be transmitted and recorded in blue. The net result would be then four sequential transmitting and recording steps corresponding to the waveforms in FIGS. 5(a)-5(d) and FIGS. 8(a)-(d). The four recordings would provide the data for twelve waveforms yielding three spatial frequencies.

The invention further contemplates the use of color, or other frequency sensitive techniques employing projected radiant energy of multiple diverse wavelength, to obviate need for the second above-discussed repetitive practice with diverse periodicity ($D_0-D_{16}$) for the case of uniform wavelength radiant energy. Thus, masks may be provided with diverse frequency transmissive character over portions thereof which give rise to repetitive numeric values in the master output pattern. For example, considering FIG. 7, pattern 52 has a common repetitive part at $d_0-d_2$, $d_2-d_4$, $d_4-d_6$, $d_6-d_8$, $d_8-d_{10}$ and $d_{10}-d_{12}$. A mask may accordingly be constructed with first frequency character from $d_0$ to $d_2$ followed by second through sixth unique frequency character from $d_2$ to $d_{12}$. The correlation between record-derived intensities, frequency characteristics and the master output pattern provides unequivocal segment identification without need for a further repetitive practice at different frequency.

While the invention has been described by practice involving the obtaining of intensity ratio characteristics from both recorded representations of object surface points and projected patterns, it is to be appreciated that the obtaining of intensity ratio characteristics from projected patterns may be dispensed with, as a continuing manipulative step, where projected patterns are of known nature. Also, electrical signals indicative of the intensity-distance characteristics of patterns may be generated and stored for automated usage. Ratio characteristic signals may be derived therefrom, and comparison of record-derived and pattern-derived ratio characteristic signals performed by suitable computer processing. In generating pattern ratio characteristic signals, use may be made of the FIG. 4 apparatus, as aforementioned.

Figure 12A:
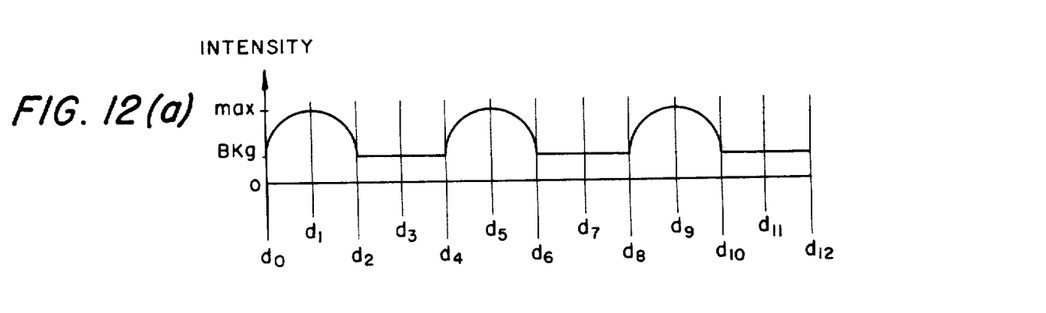
FIGS. 12(a) and 12(b) show a further type of relationship between successively projected inverse patterns in accordance with the invention.
Figure 12B:
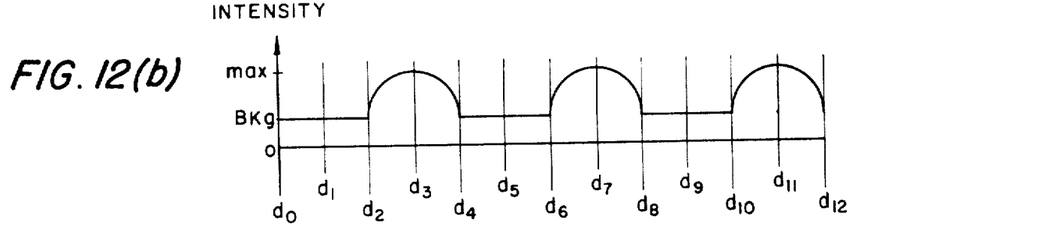

It should also be understood that projected inverse patterns need not be inverse on a point-by-point basis but may be inverse with respect to those portions carrying projection information. This is illustrated in FIGS. 12(a) and 12(b) which correspond to projection illumination which may replace FIGS. 5(a) and 5(b) and provide the same master pattern, FIG. 6(a).

Various other changes and modifications may evidently be introduced in the foregoing practices without departing from the invention. Accordingly, the particularly described practices and embodiments are intended in an illustrative and not in a limiting sense. The true spirit and scope of the invention is set forth in the following claims.

What is claimed is:

1. A method for use in defining the spatial location of object surface points comprising the steps of:
   (a) defining a projection field extending from a given location and including at least a part of said object surface including said points;

(b) irradiating said object surface part by projecting patterned radiant energy into said projection field, such projected radiant energy conforming successively to a first pattern having a continuous characteristic variation along an axis transverse to said projection field, a second pattern having such continuous characteristic variation inverse to said first pattern along said axis, a third pattern having a continuous characteristic variation along said axis diverse from such continuous characteristic variation of said first pattern, and a fourth pattern having such continuous characteristic variation inverse to said third pattern along said axis;

(c) making a separate record of said object surface part for such successive irradiation thereof; and (d) obtaining from intensity representations in said records and indicative of object surface points a ratio characteristic continuously indicative of object point location.

2. The method claimed in claim 1 wherein said step (b) is practiced in part by constructing individual radiant energy transmissive masks, each having radiant energy transmissivity along said axis conforming to a distinct one of said characteristic variations.

3. The method claimed in claim 2 wherein said step (b) is practiced in further part by successively projecting uniform intensity radiant energy onto said masks.

4. The method claimed in claim 2 including the further steps of combining said first and second patterns and said third and fourth patterns to establish respective first and second master patterns.

5. The method claimed in claim 4 including the further steps of combining said first and second master patterns to provide an output master pattern having intensity values corresponding to locations along said axis.

6. The method claimed in claim 5 wherein said step of combining is carried out by taking the ratio of said first and second master patterns, and said method includes the further step of correlating the values of said ratio characteristic with the values of said output master pattern, thereby identifying segments of said projection field inclusive of said object surface points.

7. The method claimed in claim 1 wherein such projected radiant energy is of uniform wavelength.

8. The method claimed in claim 1 wherein such projected radiant energy is of multiple diverse wavelength.

9. The method claimed in claim 1 including the further steps of:

(e) obtaining from said patterns in step (b) a ratio characteristic indicative of radiant energy projected along said axis with respect to distance along said axis; and (f) comparing said ratio characteristic obtained in step (d) with said ratio characteristic obtained in step (e), thereby identifying the location of said object surface points with respect to said axis.

10. The method claimed in claim 9 wherein said first through said fourth radiant energy patterns are periodic in characteristic variation along said axis at a first frequency, said method including the additional steps of:

(g) further successively irradiating said object surface part by projecting patterned radiant energy into said projection field according in pattern with said first through fourth radiant energy patterns, but of common periodicity diverse from said first frequency; and (h) making a separate record of said object surface part for each such further successive irradiation thereof.

11. The method of claim 10 including the further steps of:

(i) obtaining from intensity representations in said records of step (h) and indicative of object surface points a ratio characteristic indicative of object point location;

(j) obtaining from said patterns in step (g) a ratio characteristic indicative of radiant energy projected along said axis with respect to distance along said axis; and (k) comparing said ratio characteristic of step (i) with said ratio characteristic of step (j), thereby identifying the location of said object surface points with respect to said axis.

12. The method of claim 11 including the further step of:

(l) further comparing the comparison made in step (f) and the comparison made in step (k), thereby further identifying the location of said object surface points with respect to such axis.

13. The method claimed in claim 9 wherein said steps (d) and (e) are practiced in part by generating electrical signals indicative of said ratio characteristics.

* * * * *